May 31, 1932.  F. R. MOULTON  1,860,943
METHOD OF AND APPARATUS FOR MOTION PICTURE PROJECTION
Filed March 13, 1920   2 Sheets-Sheet 2

INVENTOR
Forest Ray Moulton
BY
Pane Carpenter
ATTORNEY

Patented May 31, 1932

1,860,943

UNITED STATES PATENT OFFICE

FOREST RAY MOULTON, OF CHICAGO, ILLINOIS, ASSIGNOR, BY MESNE ASSIGNMENTS, TO ACME MOTION PICTURE PROJECTOR COMPANY, OF CHICAGO, ILLINOIS, A CORPORATION OF ILLINOIS

METHOD OF AND APPARATUS FOR MOTION PICTURE PROJECTION

Application filed March 13, 1920. Serial No. 365,487.

My present invention relates in general to such arts as kinetoscopy which employ intermittently moved devices, and more particularly apparatus utilizing an intermittent drive for causing certain parts thereof to come either into register or into predetermined relation in succession, and has special reference to the provision of an improved method of the character referred to which may be utilized for intermittently moving and acting upon a strip of relatively fragile material, such as for the successive projection upon a screen of the members of a series of pictures borne by a photographic film strip.

In accomplishing my improved (1) method for the projection of motion pictures, I employ certain novel apparatus utilizing markedly improved (2) light projection devices, (3) light modification devices, (4) positioning mechanism for the moving material, (5) intermittent motion devices, (6) light interruption devices, combining them into an improved (7) motion picture projection machine, which embodies a number of features also of utility when incorporated in a camera employed for the production of the pictures to be projected.

While mechanism of the character referred to find a wide field of utility, it is especially useful for drawing the photographic film employed in motion picture apparatus step-by-step into position before a source of light and then effecting projection of the consecutive film portions upon the screen whereupon the pictures are displayed.

Inasmuch as I have illustrated my present invention as embodied in a motion picture projection machine, to-wit: in a machine employing an improved projection light and associated parts, a novel intermittent driving mechanism for attaining an improved intermittent motion of a motion picture film strip, and an improved positioning of the several pictures borne thereby, and an improved form of shutter for interrupting the projection of light rays through the film strip and upon the screen, I will premise that the film carries a series of pictures which are equally spaced and which are shown in succession; that there is a cycle corresponding to each picture on the film consisting of a short interval during which the film is moved into proper register with the opening in the frame arranged between the light source and projection lens, and another interval during which it is stationary and during at least part of which it is being projected onto a screen; that it is important in a machine of the character referred to not only that the step-by-step motion of the film be attained accurately but also that acceleration of such motion be uniform and smooth in order that the successive portions thereof projected upon the screen be so projected as to register upon the screen as perfectly as possible to the end that the picture shown may be clear; that such step-by-step movement of the film and the interposition of light-interrupting means (such as a revolving shutter) if such be employed be so co-ordinated that the step-by-step motion of the film strip is effected during the eclipse of the light projection to the end that the bodily movement of the film strip may not be apparent to the spectators; and furthermore, that it is most desirable that a high degree of illumination of the screen through the film and a minimum of vibration of the apparatus be attained, as well as that irregularity of motion or jerkiness be avoided and that the frequency of interruption of the light, if a light interruption device be used whilst the film is in motion, and the ratio of intervals of light and dark be such that the optical effect known as "flickering" of the picture exhibited upon the screen may be avoided.

Motion picture projection machines known to me present certain features of mechanical difficulty, among which I may mention at this time the following, viz: one relating to the high temperatures incidental to the employment of high candle power light elements used for projection purposes, which temperatures require the use of an auxiliary shutter which is interposed between the source of light and the film strip save when the latter is moving rapidly; another relating to the framing of the picture, that is, properly positioning it in the opening in the frame while the film is stationary, without straining the film and thus endangering it, displacing it with respect to the objective and thus impairing the focus, or placing the intermittent driving mechanism out of synchronism with the shutter and thus necessitating a supplementary adjustment; a third relating to the driving of the film in such a manner and through as small a fraction of a cycle as may be attained so that the time during which the film is eclipsed by the shutter may be abbreviated as much as possible even to the extent, as I seek, of the discontinuance of such eclipsing, and that the motion of the film, when produced, may be produced with the use of a minimum of force so that the film may be subjected to a minimum of the strain and wear-and-tear which eventually, if it does not cause it to break, at least largely destroys its usefulness; and a fourth relating to so proportioning the trajectory of the light interrupting elements, if such be used, across the cylinder of light rays passing through the projection lens, that is, the ratio between the diameter of the lens and the absolute width and number of the shutter blades, traversing it on the one hand, and on the other hand the ratio between the total of periods of light interruption and of light projection during each cycle of movement of the light interrupting means, that a high degree of illumination may be attained without the spectators becoming sensible of the lineal movement of the film strip.

The principal objects of my present invention, therefore, involve in addition to the provision of an improved method of and apparatus for motion picture projection, the provision of an improved projection light structure whereby a high effective candle power may be attained at relatively low temperatures; the provision of an improved light modifying and interrupting means; the provision of an improved machine adapted for the projection of motion pictures in the absence of substantially any interruption of the projection light.

In attaining the objects referred to, and such further benefits and advantages as may be hereinafter pointed out, I have provided a mechanism, one embodiment of which is illustrated in the accompanying drawings, wherein—

Figure 1:
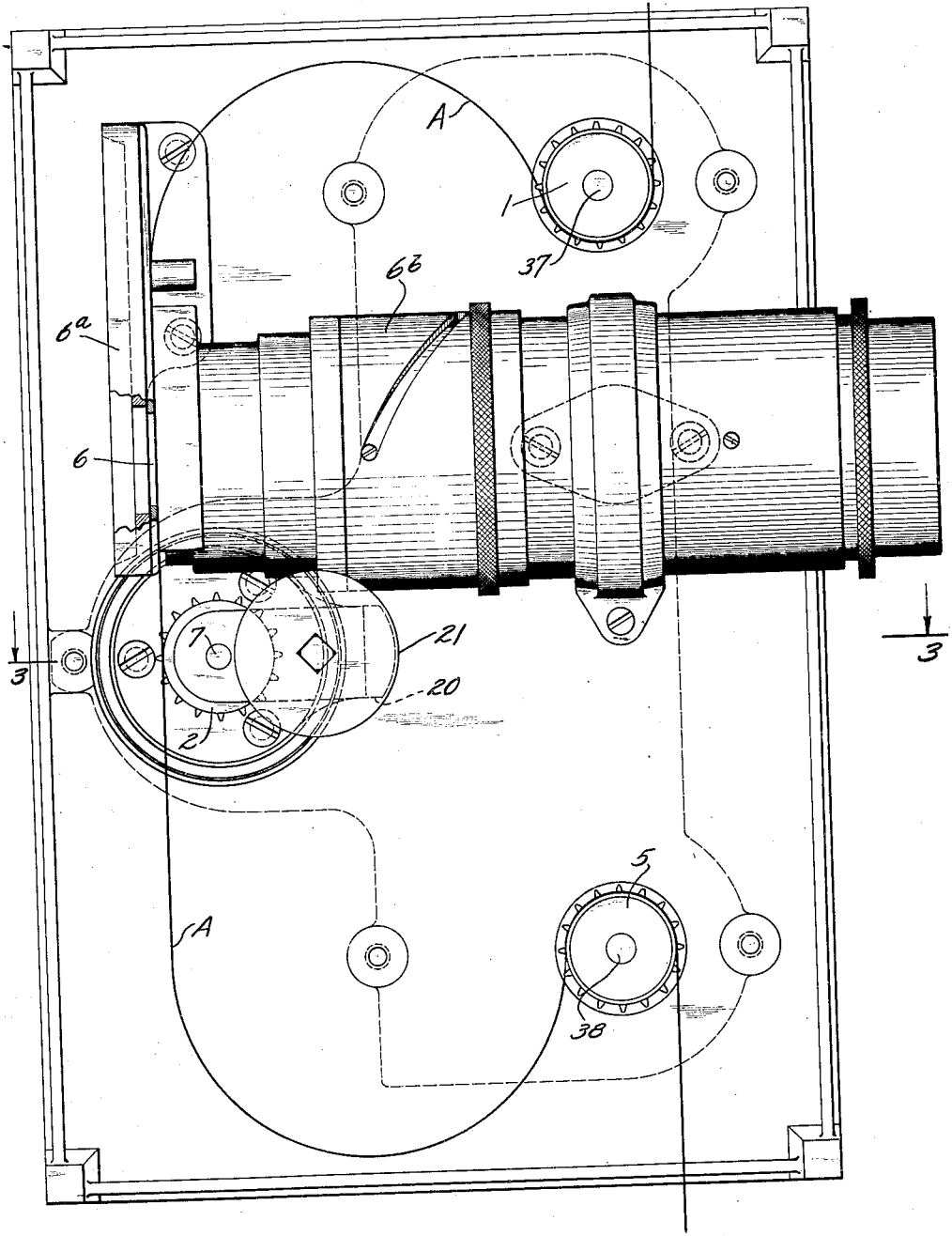
Figure 1 is an elevational view illustrative of part of a motion picture projection machine embodying my present invention, the machine being viewed from one lateral aspect thereof.

In order that the nature of my invention as applied to a motion picture projection machine may be clearly understood, I will further premise (a) a typical motion picture machine employing in general the practice which is at present approved, and (b) what are considered the essential features of the intermittent driving mechanism and the framing mechanism employed therein.

A typical motion picture projection machine includes a double sprocket 1, driven at a uniform speed, which by virtue of its teeth engaging marginal perforations on both edges of the film, A, draws such film from a holding reel (not shown) and delivers it into position to be passed through the machine, that is, before the projection light L. There is also employed a double sprocket, 2, which is driven intermittently by suitable mechanism. This mechanism usually includes a "star wheel" of the general form of the Geneva cross, having either three or four slots, wherein each of the slots has parallel sides.

A revolving shutter structure 4 is interposed between that part of the film which passes in front of the projection light and the screen, S. The intermittent motion device, just referred to, is so driven and so related to the shutter, 4, that the portion of the film which is exposed to the light, and which is projected on the screen, is stationary while the shutter, 4, is "open" and is moved only while the shutter is "closed". A third sprocket, 5, driven at a uniform speed, is commonly employed to deliver the film, as it passes through the machine, after projection upon the screen, to a winding-up reel (not shown).

The several double sprockets, 1, 2 and 5, are provided with teeth normally about one-sixth of an inch apart which engage in corresponding perforations adjacent to the margins of the film. The vertical width of each picture on the film is about three-quarters of an inch and consequently there are a number of such marginal perforations on each edge of the film, corresponding to each picture thereon.

Obviously, when the film is inserted into the machine, it is more than likely that the teeth on the sprocket, 2, will not engage in such perforations in the film in such a manner that the picture will be exactly opposite to the aperture 6 of the frame 6a, which is interposed between the projection light L and a barrel, 6b, of a focusing lens while the film is stationary.

Inasmuch as an auxiliary shutter or screen is generally interposed between the film A and the light, when such film is stationary, or being run at a low speed, to the end that such film may not become over-heated by the light, the position of the picture with reference to the aperture, 6, and the lens barrel, 6b, is only discoverable when the machine is being run at or near its full speed, and consequently means must be employed to adjust the film with reference to the opening 6 and the star-wheel 3 while the film is being run.

This matter of bringing the individual pictures into the required relationship to the aperture 6 at the instant the film is stationary is what is known as framing, and while various expedients have been used for this purpose, they all present one or more of the difficulties hereinabove suggested by me as desirable to overcome for the reasons set forth.

Another desideratum is that the time consumed in an increment of movement of the film be reduced to the minimum.

One advantage of having the film moved during only a small fraction of a cycle is that it is then necessary to have the light eclipsed only a small fraction of a cycle. This makes it possible to project more light onto the screen and to reduce correspondingly (1) the candle power of the source, (2) the heat in the machine, and (3) the heat on the film while it is being exposed. When the motion takes place in one-eighth of a cycle, for example, the efficiency of the light is twice that when a Geneva form star-wheel is used. A second and paramount advantage is that when the film is moved during only one-twelfth of a cycle it is feasible, and I have found it desirable, to use a shutter with a plurality of, say four, blades, thus producing such frequent interruptions of the light that the appearance of flickering, which is now present in all pictures produced by motion picture projection is absolutely and completely eliminated from the field of visibility.

In order that the nature of my improved light interruption element may be more fully understood, I further deem it proper to analyze the construction and operation of the ordinary revolving shutter provided with two or three blades and commonly used at this time in motion picture projection machine practice.

Figure 2:
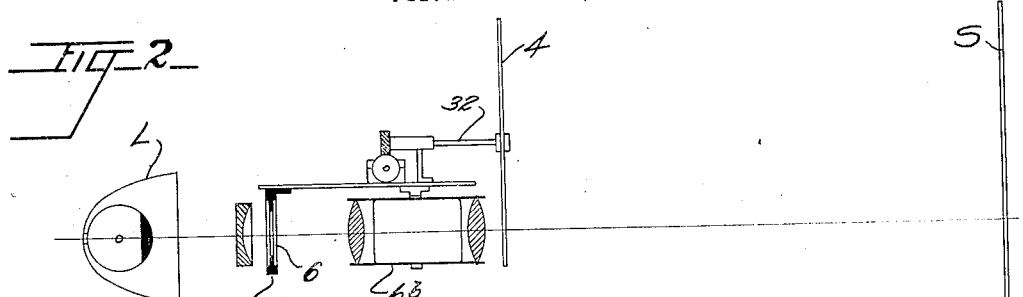
Figure 2 is a diagrammatic view illustrative of the method of operation of a motion picture projection machine embodying my present improvements.
Figure 3:
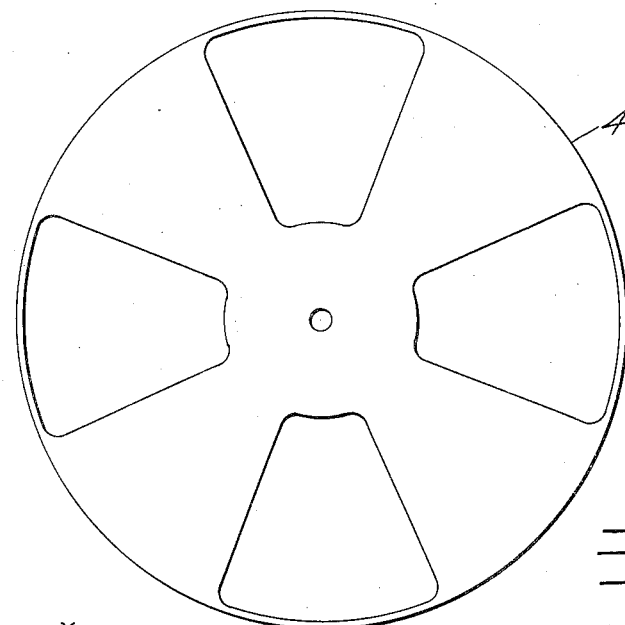
Figure 3 is an end elevational view of the light interrupting device shown in plan in Figure 2.
Figure 4:
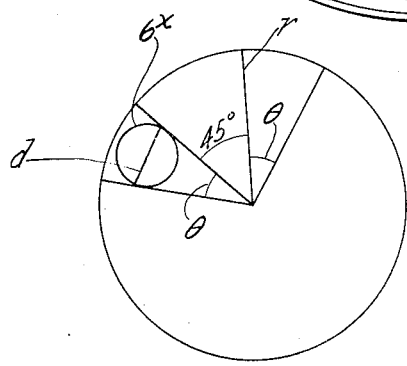
Figure 4 is a diagram employed to explain the theory of form and operation of the structure and relationship of certain of the parts shown in Figures 2 and 3.
Figure 5:
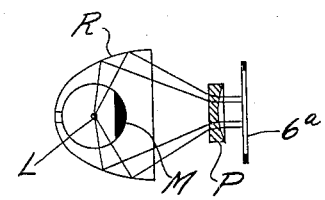
Figure 5 is a diagram employed to explain the contours of the projection light structure.

Referring now more particularly to Figures 1 to 5 of the drawings, it is assumed (1) that the shutter structure, 4, rotates once in a cycle of the operation of the intermittent driving mechanism, above referred to. It, therefore, follows that (2) the time of motion is $\frac{1}{n}$ of a cycle; (3) the angular distance the shutter rotates while the film is moving is $\frac{360°}{n}$ whatever the radius $r$ of the shutter blade may be; (4) the shutter blade must be at least $\frac{360°}{n}$ wide; (5) the cylinder of rays from the projection lens, 6x, has the diameter $d$ and consequently the light is not entirely cut off from the screen until the shutter is moved the linear distance $d$ across the cylinder of rays; (6) If the radius of the shutter is $r$ then to cut off the cylinder of rays completely, during the movement of the intermittent motion device, the shutter blade must rotate through the angle $\theta$ which is defined by $\theta = \frac{d}{2r-d}$; (7) the width of the shutter blade, which is necessary to interrupt the cylinder of rays the entire time during which the film is in motion is, therefore, according to the formula—

$$\frac{360°}{n} + 2\theta$$

When no "stealing" is effected, that is when the shutter blade, 4, is not narrowed and when reliance is not placed upon the relative slowness of the human eye to accommodate itself to changes in moving pictures, due to the persistence, for a certain length of time, of images upon the retina before they fade and may be replaced by others, then applying the said formula in the case of a well known projection apparatus having $d = 1\frac{21}{32}''$, and $r = 2\frac{1}{4}''$, and a 4 to 1 ratio of movement of the star-wheel 3x, the following width of shutter blade is found to be requisite—

(1) $\quad \frac{360°}{4} + 2\theta = 90 + 102 = 192°,$ but in structures embodying my present invention, wherein $d$ has the same value of $1\frac{21}{32}''$ as above, but $r = 4\frac{3}{4}''$, with ratios of movement of the star-wheel of 8 to 1 and 12 to 1, respectively, and $\theta'$ is defined by $$\sin \theta' = \frac{d}{2r' - d}$$

the following results are attained:

(2) $\quad \frac{360°}{8} + 2\theta = 45 + 48 = 93°$ (3) $\quad \frac{360°}{12} + 2\theta = 30 + 48 = 78°$ In the case of (1) just mentioned, since each of the two blades must be 192° wide, there can be no illumination, so in order to attain any illumination marked "stealing" is always effected.

Comparably with the foregoing, in a machine embodying my present improvements, since each of the two blades has a width of only 93°, making a total of but 186° of darkness and 222° of light per cycle, in the case (2) just mentioned, I am able to attain a percentage of illumination of 48, and a percentage of 57 in the last mentioned case (3). Furthermore, when employing three shutter blades (without "stealing") I am able to attain a light percentage of 22 and 35, respectively, as against 0% (total darkness) where the usual structure is employed without "stealing".

The great advantage of the employment of an intermittent machine device, which is in operation but a small part of a cycle, and of a light interruption device co-ordinated therewith according to such high ratios, and one having a relatively long radius (such as are embodied in my present invention) is quite apparent from the following table wherein I have set down in parallel columns the percentages of illumination attained by a star-wheel employing the 4 to 1 ratio and the relatively short shutter radius of the prior art, and by star-wheels employing the 8 to 1 and 12 to 1 ratios and the relatively long shutter radius of my present invention.

|  | 4 to 1 | 8 to 1 | 12 to 1 |
|---|---|---|---|
| "A"—2 blades stealing on none | −0 | 48 | 57 |
| "B"—3 blades stealing on none | −0 | 22 | 35 |
| "C"—2 blades stealing on one (2nd) | .22 | 62 | 70 |
| "D"—3 blades stealing on two (2nd and 3rd) | −0 | 49 | 62 |
| "E"—2 blades stealing on two (both) | 50 | 75 | 82.5 |
| "F"—3 blades stealing on three (all) | 25 | 62 | 75 |
| "G"—4 blades stealing on none | −0 | −0 | 13 |
| "H"—4 blades stealing on three (2nd, 3rd and 4th) | −0 | 37 | 53 |
| "I"—4 blades stealing on four (all) | −0 | 50 | 67 |
| "K"—5 blades stealing on four (2nd, 3rd, 4th and 5th) | −0 | 24 | 45 |

From the foregoing table, it will be apparent that by the use of my present improvements I am able to attain with a shutter having two blades, but without any "stealing" whatever a percentage of illumination (48%) almost as great as the optimum (50%) that is attainable with any prior procedure known to me; that under the stated conditions wherein I am able to attain such illumination, the projection light, according to prior procedure, would be totally eclipsed; that under the conditions where such optimum is attained in prior procedure, I am able to attain with the 8 to 1 ratio half again as much, or with a 12 to 1 ratio even three-fifths more illumination, since the light is uninterrupted from nut 25% of the cycle of movement in the one case and 17½% there-of in the other case; that I am able to attain from two and one-half to three times as much illumination as has been heretofore attainable with the use of a three-blade shutter; and, furthermore, that I have not only been able to employ for the first time in this art a four-blade shutter but even to attain a high percentage of illumination therewith.

It will also be apparent that one of the great advantages of my present invention is involved in the employment of relatively high ratios of star-wheel movement and picture positioning, since such not only permit a total interruption of the projection light for the positioning of a picture, and the effecting of such positioning in less time (to-wit: in 1/100 of a second or less) than has heretofore been done, in the case of pictures moved seriatim at a normal rate of say, 16 per second, but also enable me to effect a greater number of interruptions of the projection of each picture, to-wit: four or more. For example: With a 12 to 1 ratio, using five blades and not "stealing" on primary blade, that is, the one which eclipses the projection light while the picture is in motion, I am able to effect five interruptions per picture and attain a percentage of illumination of 45.

The accepted manner of bringing projection light from a source to a focus on the film in the aperture 6a has been the use of a two-lens or a three-lens condenser. The efficiency of these condensers is very low, because, in the first place, not over 14% of the light emitted by the source strikes the first surface of the condenser. At this surface about 5% is lost by reflection, some is lost by absorption in the first lens of the condenser, about 5% of the remainder is lost at the second surface thereof, about 5% is lost at the first surface of the second lens, some is absorbed in the second condenser, and about 5% of the remainder is lost at the second surface of the second lens. Consequently, only about 11%, at the maximum, of the light emitted from the source is brought to a focus on the film at the aperture 6a.

In order to use the light from the source L as efficiently as possible and obviate the use of a condenser, I have provided a novel cup-shaped reflector, R, for the light, L, and a mirror, M, employed in a novel manner, the light, L, being disposed within the reflector, R, and behind the mirror, M, the reflector, R, being preferably of the contour of half a prolate ellipsoid obtained by passing a plane through its center perpendicular to its major axis and the mirror, M, may be conveniently formed by "silvering" part of the spherical bulb of an incandescent lamp where electric current is employed for lighting service. In order to render the concentrated rays more nearly parallel to each other, I interpose a plano-concave lens P between the reflector, R, and the aperture 6a.

The light, L, is placed at the primary focus of the ellipsoid, which is so placed that the film aperture, 6a, shall be at the second focus. All light emanating from the primary focus and reflected from the ellipsoid is reflected to the second focus. Those rays which are emitted by the source in the direction of the open end of the ellipsoid, R, are reflected back from the spherical and suitably mirrored surface, M, of the bulb, it being mirrored in that sector which apparently fills the open end of the ellipsoid, R, as seen from the focus.

The equation of a prolate ellipsoidal surface referred to rectangular axes, with the origin at the center is $$(16) \quad x^2 + \frac{y^2 + z^2}{1 - e^2} = a^2,$$

where $a$ is the major semi-axis of the ellipsoid, and $e$ is the eccentricity of an axial section.

Let $r$ be the efficiency of the ellipsoidal mirror. Then it follows that the amount of light emitted by the source, L, which is reflected directly on the film aperture, 6a, is $$\frac{(1+e)r}{2}.$$

Assuming that the mirrored spherical sector, M, of the bulb has also an efficiency, $r$, then the efficiency, E', of the entire combination, including the plano-concave lens P, is $$E' = \frac{45r}{100}\Big[(1-e) + (1-e)r\Big].$$

If $r$ is $\frac{9}{10}$ and $e$ is $\frac{2}{3}$, the first being easily realized in practice, and the second giving a convenient form for the mirror, R, it is found that E'=80% in the case of a source of light employing my present improvements as compared to an efficiency of about 11% when condensers are used in the ordinary manner.

It has been ascertained from experience that in order to avoid the appearance of jerkiness in the moving picture display upon a screen by motion picture projection, that the picture must generally be projected seriatim upon the screen at the rate of not less than approximately sixteen per second, and I have ascertained that a frequency of alternation of projection and of interruption of projection of an average of more than three of such alternations per picture, and consequently of more than forty-eight per second, is desirable in order to avoid flickering. While the required number of such alternations per second is not constant, inasmuch as it depends upon at least two variable factors, viz: (1) the number of pictures projected per second, and (2) the degree of illumination of the film strip, I have found that very good results, both in stability of illumination and in intensity are attained by effecting the number of such alternations in a proportion of substantially four thereof per cycle of the picture positioning, and I, therefore, prefer to utilize a four blade shutter structure, wherein the open parts of the shutter are substantially of the same width, and the closed portions thereof are preferably all of the same width, but may be somewhat narrower than the open portions, the moving of the film strip taking place while one blade is traversing the cylinder of light emitted from the focusing lens structure 6b.

From the foregoing description, it will be apparent that by means of the employment of the novel elements and combinations provided by me, I have attained certain features of marked importance and advantage including means for utilizing all of the rays emanating from the light source in such a manner as to greatly reduce the candle power required for the illumination of the film strip and thereby reduce the incidental heat accompanying the projection of motion pictures, and in such a manner as to obviate the use of a condenser; means for so effecting the intermittent or step-by-step motion of the film strip whereby the picture may be projected seriatim that each increment thereof may not only be attained in a shorter interval but more smoothly and with less strain upon the film strip; means for framing the picture whereby adjustment of the strip relatively to the frame and to the intermittent motion mechanism may be accomplished without subjecting the film strip to any additional strain; and means for intermittently interrupting the projection of light having such a co-operative relation to the intermittent motion mechanism and to the focusing lens structure that substantially isochronous alternations of light and shade upon the screen may be effected with great rapidity; that such may be accomplished while at the same time the projection is interrupted during the entire time the film strip is in motion, and that the illustration of the picture upon the screen is not only not simultaneously decreased but is substantially increased.

Furthermore, it will be understood that I have combined and co-ordinated the several novel and useful features of construction and provided new modes and operation thereof whereby I have attained a new and improved method of motion picture projection characterized by substantial immobility of the position of pictures upon the screen, a higher degree of illumination thereof than has heretofore been possible, and a total elimination of that appreciable and objectionable variation of light and shade, or of intensity of light projected upon the screen, which is known as flickering.

Other advantages of my present invention will be appreciated by those who are skilled in the art to which it pertains.

Having thus described my invention and illustrated its use, what I claim as new and desire to secure by Letters Patent is—

1. The method of projection of a motion picture series which includes positioning the pictures seriatim at the second focus of an ellipsoidal reflector, positioning a source of light at the primary focus thereof, interposing a mirror between said foci and thereby projecting only reflected rays of said light upon the members of the series.

2. A light projector for directing rays to an objective comprising, in combination, an ellipsoidal reflector, a second reflector having the form of a sector of a sphere obscuring all direct rays to the objective and interposed between the light source and objective, a light element interposed between the said reflectors, and means for rendering rays emitted from said first mentioned reflector substantially parallel to each other.

3. A light projector comprising, in combination, an ellipsoidal reflector, a second reflector having the form of a sector of a sphere and encompassed substantially by said first reflector, a light element interposed between the said reflectors, and means for rendering rays emitted from said first mentioned reflector substantially parallel to each other.

4. The method of projecting light which includes positioning of a source of light at the primary focus of an ellipsoidal reflector, and interrupting and reflecting back to said ellipsoidal reflector all direct rays of light from said source prior to passage to an objective.

5. In a device of the character described, in combination, an ellipsoidal reflector having a light source positioned at the primary focus thereof, and a second reflector arranged transversely to the axis of said ellipsoidal reflector for preventing the projection of rays of light directly from said light source to an objective.

In testimony whereof I have hereunto signed my name.

FOREST RAY MOULTON.